350-6.9 SR

XR 3,907,197

United States Patent [19]
Pöschl et al.

[11] 3,907,197

[45] Sept. 23, 1975

[54] APPARATUS FOR AND METHODS OF READING INFORMATION CONTAINED IN CODED FORM ON INFORMATION CARRIER

[75] Inventors: Hermann Pöschl, Munich; Johann Plöckl, Unterhaching, both of Germany

[73] Assignee: Firma Erwin Sick, Optik-Elektronik, Waldkirch, Germany

[22] Filed: Aug. 2, 1974

[21] Appl. No.: 494,313

[30] Foreign Application Priority Data

Sept. 15, 1973 Germany .......... 2346509

[52] U.S. Cl. .......... 235/61.11 E; 250/555

[51] Int. Cl. .......... G06k 7/10; G08c 9/06

[58] Field of Search ...... 235/61.11 E; 250/555, 566; 340/146.3 K, 146.3 Z

[56] References Cited

UNITED STATES PATENTS

| | | | |
|---|---|---|---|
| 3,596,060 | 7/1971 | Tibbals, Jr. et al. | 235/61.11 E |
| 3,676,645 | 7/1972 | Fickenscher et al. | 235/61.11 E |
| 3,708,655 | 1/1973 | Schanne | 235/61.11 E |
| 3,718,761 | 2/1973 | Myer | 235/61.11 E |
| 3,787,107 | 1/1974 | Sick et al. | 250/566 |
| 3,818,444 | 6/1974 | Connell | 235/61.11 E |

*Primary Examiner*—Daryl W. Cook
*Attorney, Agent, or Firm*—Cushman, Darby & Cushman

[57] ABSTRACT

An apparatus for reading information provided in the form of a code on an information carrier, the apparatus including means for generating a rotating light beam which is refracted by a prism through a window onto an information carrier to sweep the code thereon, light reflected from the code being thereafter detected and interpreted by suitable means. The employment of the prism reduces the dimensions of the area swept by the light beam by deflecting portions of the light beam through the window which without the prism would need to be at least as wide as the diameter of a circle swept by the light beam.

9 Claims, 7 Drawing Figures

APPARATUS FOR AND METHODS OF READING INFORMATION CONTAINED IN CODED FORM ON INFORMATION CARRIER

BACKGROUND OF THE INVENTION

This invention is concerned with improvements in or relating to apparatus for and methods of reading information contained in coded form on information carriers, and is especially concerned with improvements in or relating to the apparatus and methods disclosed in the specification of copending U.S. patent application Ser. No. 342,250, now U.S. Pat. No. 3,823,326.

In the aforesaid specification there is disclosed a method of reading information presented in the form of a code of optically-contrasting regions on an information carrier, the method comprising the steps of;

scanning the regions in a reading plane with a light spot travelling along a circle of a diameter exceeding the length of the code in the direction in which it is to be read, the position of the scanning circle in the reading plane after each circular sweep being unidirectionally shifted a distance which is less than the width of the regions providing the code measured across the direction in which the code is to be read, whilst the information carrier traverses the reading plane across the direction of shift of the scanning circle at a speed which is slow in relation to the speed of the light spot;

converting the light reflected from the code into electrical signals in a photo-electric transducer;

and applying the output signals of the transducer to a discriminating processing system.

The aforesaid specification also discloses apparatus for use in carrying out the method.

According to the aforesaid specification there can be scanned also optically contrasting codes in which the information is contained not only in one single but several parallel lines, the scanning being carried out by means of a plurality of concentrically rotating light beams (as for example described with reference to FIG. 5 in the above mentioned U.S. application).

In practice it has been found that in carrying out the aforesaid method a window must be provided through which the beam of light is projected to scan a code on an information carrier and the window must of course be sufficiently large to allow the beam of light to describe a complete circle through the window and to allow unidirectional movement of the circle as aforesaid, so that the light spot will move along a path which is that of a highly convoluted cycloid. It will be appreciated that in order to allow for both provisions the width of the window must be at least equal to the diameter of the convolutions of the cycloid. Bearing in mind the dimensions of presently employed codes, it will be appreciated also that the width of the window must be considerable to enable the light beam to scan the code. Windows of this size are undesirable.

OBJECT OF THE INVENTION

It is an object of the present invention to provide a method of and apparatus for reading coded information on carriers thereof wherein the forementioned disadvantage can be minimized.

SUMMARY OF THE INVENTION

The present invention provides apparatus for reading information presented in the form of a code of optically-contrasting regions on an information carrier, the apparatus comprising means for providing a beam of light moving in a circular path; elongate prism means positioned so that the beam of light is incident thereon and refracted thereby; means defining an elongate window extending parallel to the prism and through which the light beam refracted by the prism can pass to scan a code on an information carrier moved crosswise to the longitudinal direction of the window; the code being scanned by means of circular arcs the double radius of which is exceeding the width of the window and is also exceeding the length of the code in the direction in which it is to be read; means for unidirectionally moving the circular path in the general longitudinal direction of the prism after or while each circle is completed; means for converting light reflected from the code into electrical signals, and means arranged to interpret the electrical signals according to the scanned code.

The prism cuts down the scanning circles into individual arcs which by refraction in the prism are projected as an overlapping pattern through the window onto the code of an information carrier. Preferably the width of the prism is at least equal to the diameter of the circle described in the plane of the incident surface of the prism.

Preferably one surface of the prism is planar across its entire width and is normal to the axis about which the light beam describes the circle; the prism then has a further face provided by a plurality of surfaces or facets, adjacent ones of which intersect along lines parallel to the length of the prism. If the prism has two output surfaces, the angle of the prism is then selected such that the width of the window need be only half the diameter of the aforesaid circle, whereas if the prism has five output surfaces, the angles between the adjacent surfaces of the prism are selected such that the width of the window need be only one-fifth of the diameter of the aforesaid circle. In an alternative apparatus, a multifacetted prism can be replaced by a plurality of prisms arranged in parallel side-by-side relationship.

It is preferred that an at least substantially monochromatic light source (for example, a laser) is used to prevent refraction of a polychromatic light beam through the prism(s) and formation of spectra which would lead to indistinct scanning of a code.

Preferably the means for providing said beam of light moving in a circular path includes a 90° prism which is rotatable about an axis normal to its base, a beam of light incident thereon being internally reflected and directed towards said means for unidirectionally moving the circular path.

Preferably said means for unidirectionally moving the circular path comprises a mirror which is movable about an axis normal to the axis of rotation of said 90° prism.

The present invention further provides a method of reading information presented in the form of a code of optically-contrasting regions on an information carrier, the method comprising the steps of:

rotating a beam of light projected onto an incident surface of an elongate prism to describe a circle in the plane of the incident surface;

unidirectionally moving the position of the circle after or during each circular sweep through a distance which is less than the width of the regions providing the code, the width being measured transversely to the direction in which the code is to be read, whilst the information carrier moves transversely to the direction of movement of the circle at a speed which is slow in relation to the circular speed of the light beam;

directing the beam of light, refracted by the prism, through an elongate window to scan the code on the information carrier, the window extending parallel to the prism and having a width less than that of said circle;

converting the light reflected from the code into electrical signals in a photo-electric transducer;

and applying output signals of the transducer to processing means arranged to interpret the output signals for reading said information.

BRIEF DESCRIPTION OF THE DRAWINGS

There now follows a detailed description which is to be read with reference to the accompanying drawings of apparatus and methods according to the present invention; it is to be clearly understood that these have been selected for description to illustrate the invention by way of example and not by way of limitation.

In the drawings.

DESCRIPTION OF THE PREFERRED EMBODIMENT

Figure 1:
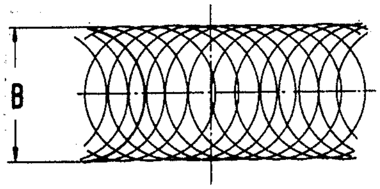
FIG. 1 is a diagrammatic representation of a convoluted cycloid which is the path of movement of a scanning light spot produced in using an apparatus and carrying out a method as disclosed in U.S. patent application Ser. No. 342,250.

The convoluted cycloid shown in FIG. 1 is a representation of the path of movement of a light spot as viewed through a window of a practical embodiment of the apparatus disclosed in U.S. application Ser. No. 342,250. The window must be large enough to allow the formation of the cycloid and for this purpose has a width B which is at least equal to the diameter of each convolution of the cycloid. This is undesirable due to disadvantages experienced in the size of the apparatus required and monitoring of the reflected light beam.

Figure 2:
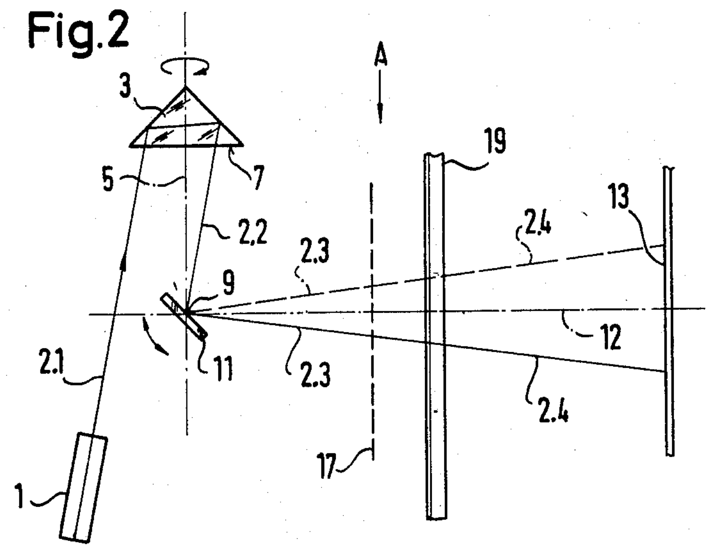
FIG. 2 is a diagrammatic view of an apparatus according to the present invention.
Figure 3:
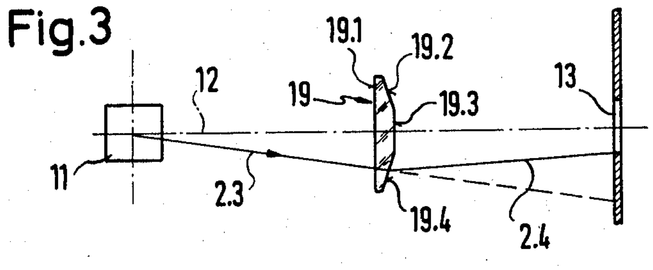
FIG. 3 is a diagrammatic view of the apparatus shown in FIG. 2 viewed in the direction of the arrow A in FIG. 2.

In the apparatus illustrated in FIGS. 2 and 3 a monochromatic light source provided by a laser 1 is provided (in the plane of FIG. 2). This generates a light beam 2.1, which falls obliquely on a prism 3 which internally reflects the light beam through 180°. This is a 90° prism having a cross section resembling a gable-end roof. Means not shown in the drawing rotate this 90° prism 3 about an axis 5 which is normal to the base of the prism. After total reflection in the rotating 90° prism the emergent beam 2.2 emerges sweeping around the peripheral surface of a cone having its apex at 9.

A plane mirror 11 is mounted for pivotal movement about an axis normal to the plane of FIG. 2 which the axis penetrates at point 9. By tilting the mirror 11 to and fro a scanning cone having its origin at 9 (and symmetrical about an axis 12) is traversed to and fro along the length of an elongate scanning window 13. The tilting deflections of the mirror 11 are fairly slow by comparison to the speed of rotation of the reversing prism 3 and in a notional plane 17 the scanning beam will generate a highly convoluted cycloid as shown in FIG. 1.

An elongate prism 19 is now interposed in the path of the cone 2.3 of the scanning beam, the length of this prism being parallel to the lengthwise extent of the scanning window 13. The prism has a plane base 19.1. and three facets 19.2, 19.3 and 19.4. The angles of the two facets 19.2 and 19.4 in relation to the facet 19.3 are equal, the facet 19.3 being parallel to the plane of the base 19.1. Whilst passing through the central part of the prism the scanning beam is not deflected so that the central portions 20.1 of the scanning circle 20 reach the scanning window 13 (FIG. 4) unrefracted. However, when the scanning beam 2.3 passes through the outer zones of the prism the beam 2.3 is refracted towards the optical axis by the facets 19.2 and 19.4 of the prism. Consequently the circular arc portions 20.2 and 20.4 are refracted into the frame of the scanning window 13. The width C of the scanning window 13 is then only about one-third of the length of the diameter of the scanning circle 20 in the plane of the window.

Within the frame of the scanning window the portions of each scanning circle overlap and this would also apply to the parts of several scanning circles reciprocated by the mirror 11 within the length of the scanning window.

If an information carrier bearing a code of optically-contrasting regions (e.g., black-and-white squares or bars) is traversed across the width of the scanning window 13 and the window is at least as wide as the code, then at least one of the arc portions will scan the black-and-white code. In the case of black-and-white codes which consist of a plurality of side-by-side bar codes, there will always be concentric arc portions which scan all the bar codes as they traverse the window.

Figure 4:
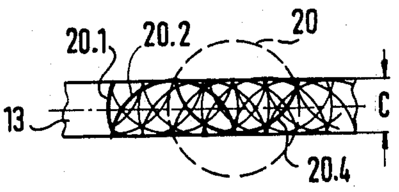
FIG. 4 is a diagrammatic representation of a configuration which is the path of movement of a scanning light beam produced in using the apparatus shown in FIGS. 2 and 3 when carrying out a method according to the present invention.
Figure 5:
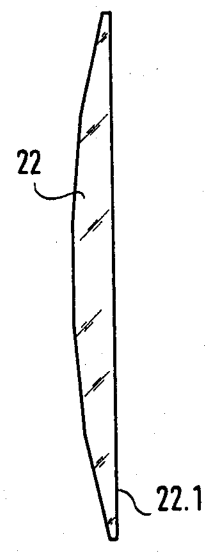
FIG. 5 is an end view of a prism suitable for use in an apparatus according to the invention.
Figure 6:
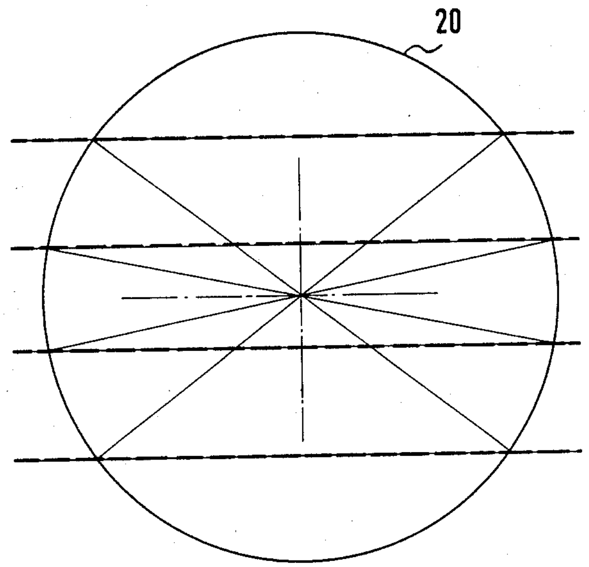
FIG. 6 is a diagrammatic representation illustrating the formation of a path of a scanning light beam using the prism shown in FIG. 6.
Figure 7:
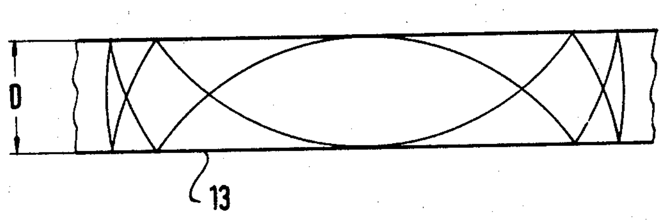
FIG. 7 is a diagrammatic representation of the path of a scanning light beam using the prism shown in FIG. 6.

It it is desired still further to reduce the width of the window below that shown in FIG. 4 then a prism having more than three facets can be used, for instance a prism with five facets as shown in FIG. 5. FIG. 6 illustrates the manner in which such a prism disects a scanning circle 20 into component arc portions. FIG. 7 shows how these component arc portions fit into the scanning window 13. The width D of this window is about one-fifth of the diameter of the scanning circle 20.

If a reduction of the width of the scanning window to only one-half is desired then a simple triangular prism can be used instead of the prism 19.

What we claim is:

1. Apparatus for reading information presented in the form of a code of optically-contrasting regions on an information carrier, the apparatus comprising means for providing a beam of light moving in a circular path; elongate prism means positioned so that the beam of light is incident thereon and refracted thereby;

means defining an elongate window extending parallel to the prism and through which the light beam refracted by the prism can pass to scan a code on an information carrier moved crosswise to the longitudinal direction of the window; the code being scanned by means of circular arcs the double radius of which is exceeding the width of the window and is also exceeding the length of the code in the direction in which it is to be read; means for unidirectionally moving the circular path in the general longitudinal direction of the prism after or while each circle is completed; means for converting light reflected from the code into electrical signals, and means arranged to interpret the electrical signals according to the scanned code.

2. Apparatus according to claim 1 wherein the width of the prism is at least equal to the diameter of the circle described in the plane of the incident surface of the prism.

3. Apparatus according to claim 1 wherein one surface of the prism is planar across its entire width and is normal to the axis about which the light beam describes the circle.

4. Apparatus according to claim 1 and further comprising a light source which is at least approximately monochromatic.

5. Apparatus according to claim 4 wherein the light source is provided by a laser.

6. Apparatus according to claim 1 wherein the means for providing said beam of light moving in a circular path includes a 90° prism which is rotatable about an axis normal to its base, a beam of light incident thereon being internally reflected and directed towards said means for unidirectionally moving the circular path.

7. Apparatus according to claim 6 wherein said means for unidirectionally moving the circular path comprises a mirror which is movable about an axis normal to the axis of rotation of said 90° prism.

8. Apparatus according to claim 1 wherein the prism has a face provided by a plurality of surfaces or facets, adjacent ones of which intersect along lines parallel to the length of the prism.

9. A method of reading information presented in the form of a code of optically-contrasting regions on an information carrier, the method comprising the steps of:

rotating a beam of light projected onto an incident surface of an elongate prism to describe a circle in the plane of the incident surface;

unidirectionally moving the position of the circle after or during each circular sweep through a distance which is less than the width of the regions providing the code, the width being measured transversely to the direction in which the code is to be read, whilst the information carrier moves transversely to the direction of movement of the circle at a speed which is slow in relation to the circular speed of the light beam;

directing the beam of light, refracted by the prism through an elongate window to scan the code on the information carrier the window extending parallel to the prism and having a width less than that of said circle;

converting the light reflected from the code into electrical signals in a photo-electric transducer;

and applying output signals of the transducer to processing means arranged to interpret the output signals for reading said information.

* * * * *